Figure 1:
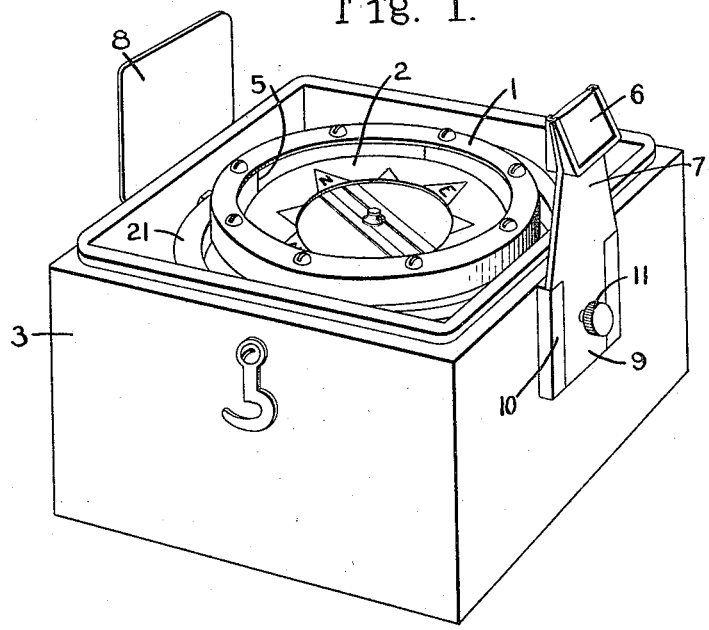

J. F. COLE.
AZIMUTH COMPASS.
APPLICATION FILED FEB. 20, 1915.

1,145,056.

Patented July 6, 1915.

Witnesses.
J. Morrill Fuller
William E. Gagen

Inventor.
John F. Cole
by Heard Smith & Tennant.
Att'ys

UNITED STATES PATENT OFFICE.

JOHN F. COLE, OF SOMERVILLE, MASSACHUSETTS.

AZIMUTH-COMPASS.

1,145,056.  Specification of Letters Patent.  Patented July 6, 1915.

Application filed February 20, 1915. Serial No. 9,495.

*To all whom it may concern:*

Be it known that I, JOHN F. COLE, a citizen of the United States, residing at Somerville, county of Middlesex, State of Massachusetts, have invented an Improvement in Azimuth-Compasses, of which the following description, in connection with the accompanying drawing, is a specification, like characters on the drawing representing like parts.

This invention relates to an azimuth compass and has for its general object to provide a compass of this type having a simple construction and one in which the reading can be made by the observer while his eye is on the distant object and without the necessity of employing either a telescope or a narrow slit with a hair line (commonly called a sight vane) for sighting the distant object. An azimuth compass of this construction is much more easy to manipulate than one in which the distant object is sighted through a telescope or sight vane because the operator has a much wider field of vision and the reading is more easily made.

I attain the above-mentioned object by using means associated with the compass by which the virtual image of the lubber-line and the adjacent portion of the compass card are projected in a direction parallel to the horizon so that when the observer directs his vision toward the distant object, the direction of which is to be determined, and holds the instrument between himself and the distant object with the lubber-line in the general vertical plane of the object, the virtual image of the lubber-line and of the adjacent portion of the compass card will appear to the observer directly in his line of vision, thus enabling him to read the direction of the distant object.

In order to give an understanding of the invention and the principle on which it operates, I have illustrated in the drawings a selected embodiment thereof which will now be described, after which the novel features will be pointed out in the appended claims.

Figure 2:
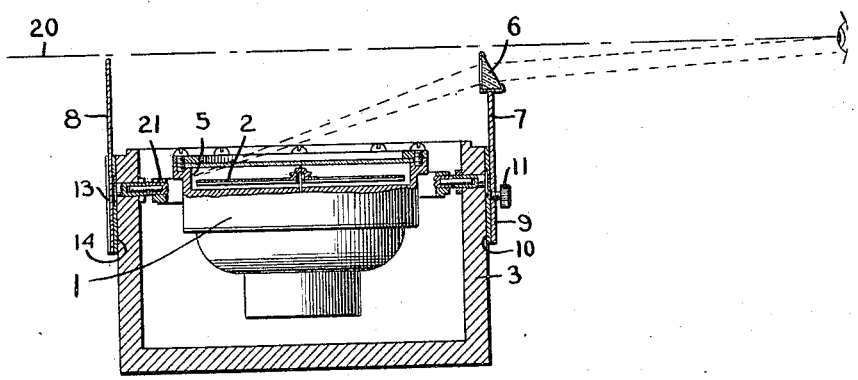

In the drawings, Figure 1 is a perspective view of an instrument made in accordance with my invention; Fig. 2 is a vertical sectional view through the prismatic lens and compass.

I have shown in the drawings a compass 1 of any suitable or usual construction, it being provided with the usual compass card 2. The compass is herein illustrated as mounted in a holder 3 in the form of a box-like casing by means of the usual gimbal ring 21 so that the compass will always maintain a level or horizontal position, even though the box 3 occupies an inclined position. The compass is provided with the usual lubber-line 5 adjacent the edge of the compass card 2.

The device as thus far described may have any suitable or usual construction as my improvements can be applied to any ordinary compass. These improvements consist of means associated with the compass and adapted to project a virtual image of the lubber-line 5 and adjacent portion of the compass card into a horizontal plane so that when the instrument is held in front of the observer with the lubber-line in the vertical plane of the distant object the virtual image of the lubber-line and adjacent portion of the compass card will also be seen by the observer. In the illustrated embodiment of my invention this image-projecting means is in the form of a prismatic lens 6 which is sustained in a suitable carrier 7 secured to the box or holder 3 and its construction is such that it causes a deviation of the light rays from the lubber-line and adjacent portion of the compass-card, as shown by the dotted lines Fig. 2. Situated on the opposite side of the holder or box 3 is a shield 8, the top edge of which is slightly below the level of the upper edge of the prismatic lens. This shield is employed in order to make a better background for the refracted image of the lubber-line and compass card by preventing extraneous reflections.

In using the device the operator brings his vision onto the distant object, the direction of which is to be determined, and then holds the instrument in front of him in a horizontal position so that his line of vision to the distant object will pass directly over the tops of the prismatic lens 6 and shield 8, as shown by the dot and dash lines 20 in Fig. 2. When the instrument is held in this position the light rays from the lubber-line and adjacent portion of the compass card will be refracted by the prismatic lens 6, as indicated by the dotted lines, so that the observer is able to see the virtual image of the lubber-line and adjacent portion of the compass card. The observer then turns the instrument in azimuth to bring the lubber-line image in the vertical plane of and directly beneath the distant object, and when this has been done he merely reads the compass-card through the lens 6, this reading giving him the exact direction of the distant object.

I will preferably make the prismatic lens 6 so that it not only acts as a prism to deviate the light rays, but also so that it acts as a lens to refract and collinate the pencil of rays emanating from the lubber-line and adjacent point on the compass card. The advantage of this is that the light rays passing through the prismatic lens 6 reach the observer's eye in substantial parallelism in the same way as if they came horizontally from a distant object and thus the observer can see both the image and the distant object at the same time and without any necessity of accommodating the focus of his eyes for near and distant objects. This construction obviates any parallax between the refracted image of the lubber-line and compass card, and the horizon or distant object.

The prismatic lens 6 has such a construction that the image of the lubber-line and compass card is not inverted and the observer, therefore, makes the reading exactly as he would if looking directly at the compass.

There are several advantages which result from the construction above described. In the first place since no telescopes or sight vanes are used for sighting the distant object, the observer has a wide field of vision and can easily keep his eye on the distant object even though he is using the instrument on board a ship which has considerable movement or in any location where it is not easy to hold the instrument perfectly steady. Again, since the refracted virtual image of the lubber-line and compass card is not inverted the device can be used in connection with any ordinary compass without requiring any special lettering on the compass. Further, the construction of the lens which causes the collimation or parallelism of the light rays magnifies the image so that the reading is easily made even if the light is dim. The construction has further advantages that it can be applied to any ordinary compass, this involving merely associating with the compass a prismatic lens having a proper focus and properly situated with reference to the lubber-line.

In the illustrated embodiment of my invention the carrier 7 for the prismatic lens 6 is made adjustable in and also detachable from the box 3. For this purpose the carrier 7 is provided with a depending dovetailed stem 9 which is adapted to be received in a dove-tailed guideway 10 formed on the holder or box 3. The carrier is adjustable vertically in this guideway 10 and can be held in position by the set-screw 11. I will also preferably make the shield 8 detachable from the casing 3, this being provided for by forming the shield with a stem 13 which is received in a guideway 14 carried by the casing or holder. The advantage of making the shield and lens detachable is that it permits them to be removed if the compass is to be used in the ordinary way and provides for their ready attachment to the compass if it is used as an azimuth compass. The lens and shield are readily attachable to any compass.

While I have herein illustrated one embodiment of my invention I would state that the latter is not limited to the construction shown as many changes may be made without departing from the invention.

I claim:

1. In a device of the class described, the combination with a compass having a lubber-line and a compass card, of a prismatic lens situated on the opposite side of the compass from that side bearing the lubber-line and in a position to project a virtual image of said lubber-line and the adjacent portion of the compass card in a horizontal plane whereby when the instrument is held by an observer with the lubber-line in the vertical plane of his line of vision to a distant object the image of the lubber-line and adjacent portion of the compass card will be visible.

2. In a device of the class described, the combination with a compass having a lubber-line and a compass card, of a light-refracting member situated on the opposite side of the compass from that bearing the lubber-line and in a position to refract the light rays emanating from the lubber-line and project a virtual image thereof and the adjacent portion of the compass card in a horizontal plane whereby when the instrument is held by an observer with the lubber-line in the vertical plane of his line of vision to a distant object the image of the lubber-line and adjacent portion of the compass card will be visible to the observer.

In testimony whereof, I have signed my name to this specification, in the presence of two subscribing witnesses.

JOHN F. COLE.

Witnesses:
BERTHA F. HEUSER,
THOMAS J. DRUMMOND.